Feb. 11, 1958 R. D. COLCHAGOFF 2,822,777
APPARATUS FOR APPLYING SEALING COMPOSITIONS TO GLASS PARTS
Filed Aug. 24, 1955 3 Sheets-Sheet 2

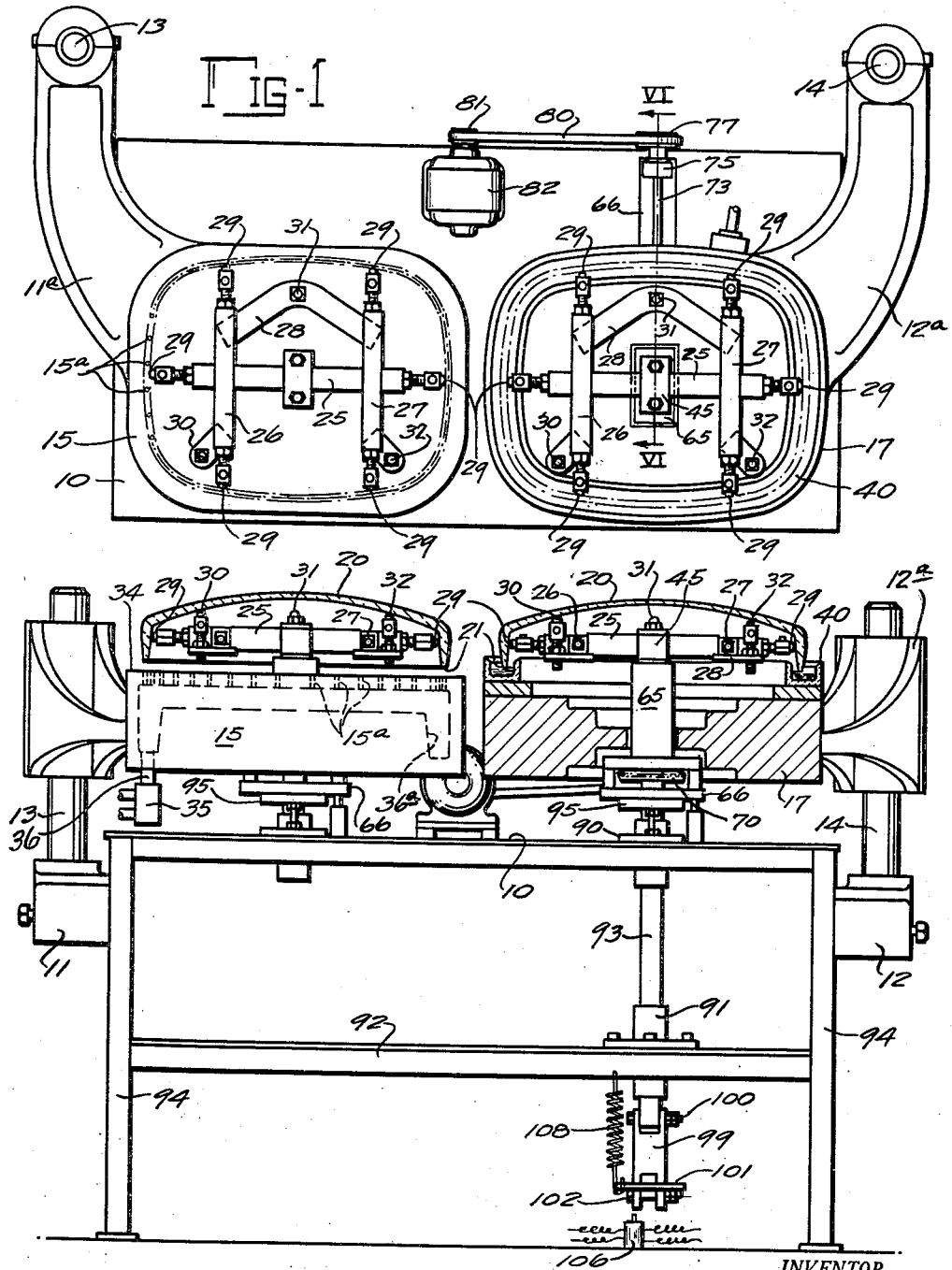

INVENTOR.
ROBERT D. COLCHAGOFF
BY W. A. Schaich
Leonard D. Doubler
ATTORNEYS

Feb. 11, 1958 R. D. COLCHAGOFF 2,822,777
APPARATUS FOR APPLYING SEALING COMPOSITIONS TO GLASS PARTS
Filed Aug. 24, 1955 3 Sheets-Sheet 3
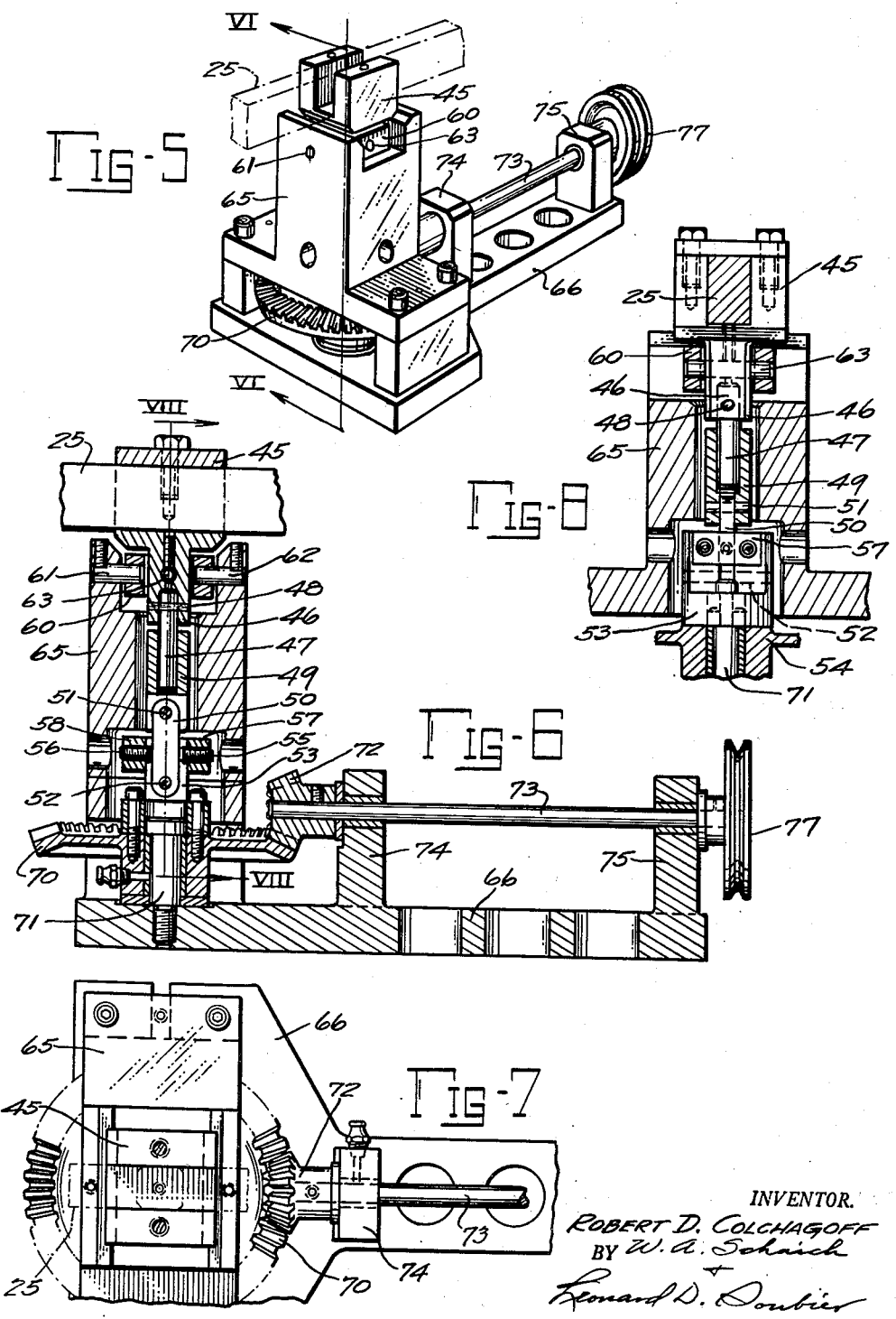
INVENTOR.
ROBERT D. COLCHAGOFF
BY W. A. Schaich
Leonard D. Doubier
ATTORNEYS

United States Patent Office 2,822,777
Patented Feb. 11, 1958

2,822,777

APPARATUS FOR APPLYING SEALING COMPOSITIONS TO GLASS PARTS

Robert D. Colchagoff, Holland, Ohio, assignor to Owens-Illinois Glass Company, a corporation of Ohio Application August 24, 1955, Serial No. 530,329

6 Claims. (Cl. 118—58)

This invention relates to an apparatus for joining glass to glass or glass to metal and more specifically to an improved apparatus for applying a low melting bonding or sealing composition to higher melting glass, vitreous or metal parts to facilitate their subsequent assembly into composite units.

This present invention relates to a novel means for coating the edges of a prefabricated shaped part to be united to a second part by low melting compositions at temperatures which will not affect the individually shaped parts. The apparatus is particularly valuable in the fabrication of composite glass articles such as cathode-ray tubes where the use of high temperatures must be avoided to prevent damage to both the glass parts and any working parts within the tube.

This present invention eliminates the inherent problem encountered in the uniform application of low melting bonding compositions to glass or metal surfaces, viz., the surging of the composition at the time of application to the parts.

The principal object of this invention is to provide an economical and improved apparatus for the uniform application of a low melting glass brazing composition to the sealing or joining edge surface portions of shaped individual parts composed of higher melting material to facilitate their subsequent further fabrication. The specific nature of the apparatus, as well as other objects of the invention and advantages thereof, will be apparent to those skilled in the art by reference to the accompanying drawings and detailed description.

In the accompanying drawings:

Fig. 1 is a plan view of the mechanism for preheating and coating the joining surface edges of articles;

Fig. 2 is a part sectional elevation of the apparatus;

Fig. 5 is an isometric view of the rotary rocking mechanism;

Fig. 6 is a sectional elevational view showing the dipping structure and drive therefor;

Fig. 7 is a plan view of the dip structure; and

Fig. 8 is a sectional view of the dip control structure as taken at line VIII—VIII on Fig. 6.

Figure 3:
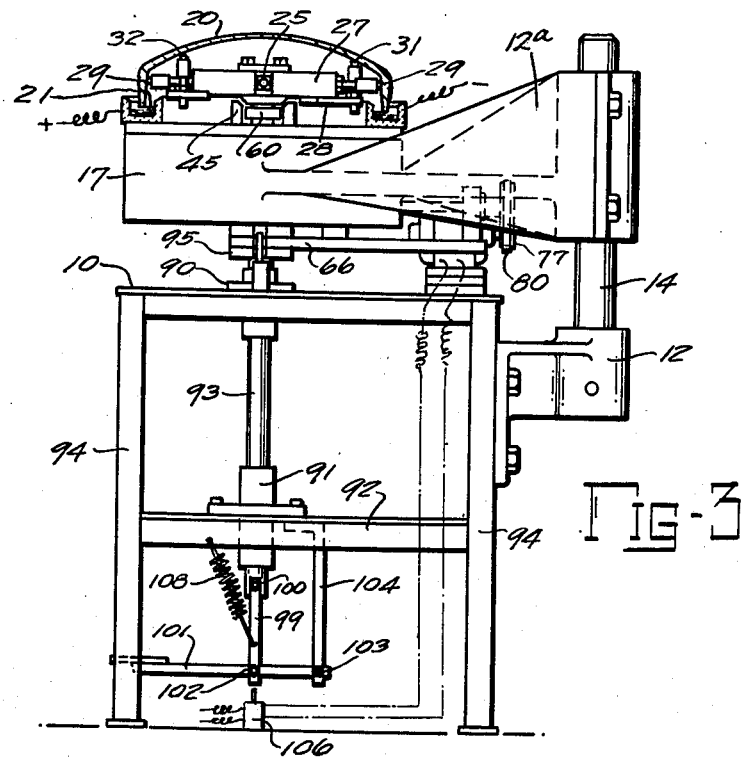
Fig. 3 is an end view in elevation showing the article in cross section and positioned over the sealing composition.
Figure 4:
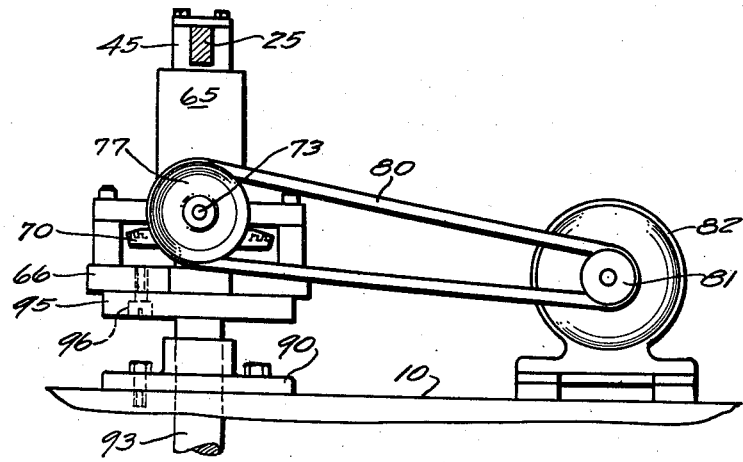
Fig. 4 is an elevational view showing the motor drive mechanism for this apparatus.

The invention will be described hereinafter as applied to coating of the sealing edges of glass articles, but it is to be appreciated that articles of metal, ceramics, etc., may also be used.

Referring specifically to the drawings and Figs. 1 and 2 thereof, a table 10 supports brackets 11 and 12 at opposite ends thereof, in which are mounted vertical shafts 13 and 14 respectively. Arm extensions 11a and 12a are adapted to support a burner 15 and a sealing composition trough 17 respectively. The trough 17 is electrically energized to provide heat for maintaining the sealing composition in a molten state.

Two separate glass article supporting mechanisms are provided and in both instances the particular mechanism for supporting the glass parts 20 are of the same basic structure. Therefore the description of one such structure will suffice for both. This glass supporting structure is comprised of arms 25, 26, and 27 arranged in an H-formation and in the same horizontal plane. The outer end of each of these arms, supports adjustable glass contact elements 29 adapted to contact the inner surfaces of the glass article 20 and maintain it in a predetermined horizontal position. Vertical glass contact members 30, 31, and 32 also supported by the arms 26, 27, and 28, provide a three-point contact with the glass member to position it in a predetermined vertical plane and thus bring the sealing edge 21 to within a given distance above the top surface 34 of the burner 35 or the top surface of the sealing composition in the trough 40, as the case may be.

Gas and air are supplied to a combustion mixer 35 which in turn is connected to the burner 15 by pipe 36 admitting the combustible mixture into burner chamber 36a from whence it issues through burner openings 15a in the form of small flames in alignment with and in the pattern or contour of the sealing edge 21 of the glass member 20.

Also mounted on the table 10 and positioned to one side of the burner is the support member 17 which supports a trough 40 adapted to hold a sealing composition and maintain same in molten condition. Glass supporting members 25, 26, 27, and 28 form the same type of assembly as previously described in connection with the heating burner structure. Vertical glass support contact points 29, 30, and 31, and horizontal contact points 29, position a glass member 20 in its predetermined vertical and horizontal planes. However, in this instance the arms 25, 26, and 27 are mounted on a vertical shaft assembly member 45 which is adapted for vertical motion to move the sealing edge 21 of an article 20 to and from the trough 40 and for supplying rocking motion about the vertical center line of shaft member 45.

The rocking mechanism consists of the supporting head 45 with its article supporting arms 25, 26, and 27. The head 45 has a portion 46 extending vertically downward with an extension shaft 47 pinned to member 46 by a dowel 48. Shaft 47 has a free sliding connection with a yoke 49. A link 50 is fulcrumed at 51 on yoke 49 and at 52 with the driving yoke 53, thus providing a driving connection for the yoke 49.

Adjusting screws 55 and 56 are mounted in plates 57 and 58 respectively with said plates 57 and 58 attached to the opposite sides of the yoke 53. Adjustment of screws 55 and 56 controls the amount of set inclination of the link 50 from the vertical plane and thus controls the amount of rocking of the head 45 about the pivots 61, 62, and 63, and in turn the axial rotation of member 49 about the vertical center line of the support 65. At the same time the adjustment of these screws 55 and 56 limit the depth to which the sealing edge 21 is immersed in the composition.

This axial rotation of member 49 about the vertical center line of support 65, will through connections to the collar 60, cause the support 45 to progressively fulcrum about the pivot members 61, 62, and 63. The pivots 61 and 62 are mounted in the support 65 and thereby cause the member 45 to rock relative to the support 65, but due to the free sliding connection between shaft 47 and yoke 49, there will not be any actual rotation of member 45 about said center line. The continued rotation of member 49 will then cause the member 45 to rock about the pivot 63, which is mounted in the collar 60, and this rocking motion will be relative to both the collar 60 and support 65. Thus, the sealing edge of an article mounted on the arms 25, 26, and 27 which are attached to support 45, will have a progressing dipping motion and will thereby be dipped into the sealing composition in trough 40 with a progressively rolling motion along its lineal length and about the vertical center line of support 65.

The drive for obtaining this rocking rolling motion consists of miter gear 70 attached to yoke 53 and adapted for rotation on a vertical shaft 71 mounted in the base 66. A miter pinion 72 which meshes with gear 70 is attached to and mounted on a horizontal shaft 73 supported in bearings 74 and 75 formed on the base 66. A pulley 77 attached to one end of shaft 73 is driven through a belt 80 and pulley 81 on an electric motor 82.

The positioning of the article 20 so that it may be immersed in the sealing composition in trough 40 during the rocking motion, is accomplished through the raising and lowering of arms 25, 26, and 27 with member 45.

Bearing members 90 and 91 mounted on table 10 and cross member 92 extending between uprights 94, respectively support a vertical shaft 93 for vertical sliding motion. The shaft 93 has at its upper end a head formation 95 which is attached to base member 66 by screws 96. A link 99 is attached to the lower end of shaft 93 by fulcrum pin 100 and said link is also attached to a peddle arm 101 by fulcrum pin 102. The peddle arm 101 is fulcrumed at 103 on a support 104 attached to the cross member 92.

An electric switch 106 is provided beneath link 99 and is adapted for contact with said link when the peddle arm 101 is depressed. The contact between link 99 and switch 106 energizes the electric motor 82 which through its belt 80, pulleys 81 and 77, and gears 70 and 72, will drive the rocking member 45 and cause the sealing edge of an article to have progressively rolling contact with the sealing composition in trough 40. A spring 108 attached to the link 99 and cross member 92, normally holds the article 20 out of possible contact with the sealing composition in trough 40.

In operation, an article to be edge-coated, for subsequent sealing to a second article to form thereby a composite article, is presented at an initial station where the article is positioned upon supports 30, 31, and 32 for vertical location and where contacts 29 on arms 25, 26, and 27 locate the article horizontally. This vertical and horizontal locating is required in order that the sealing edge 21 of the article 20 may properly be positioned with respect to the flame orifices 15ª of the burner 15. These flame orifices 15ª are arranged in a pattern or contour paralleling that of the sealing edge 21 and such accurate positioning permits the quick and uniform heating of the edge 21 to thereby create a temperature gradient extending inwardly of the glass body from said edge. When edge 21 has been heated to a temperature conducive to providing fusion as between it and a sealing composition, the article 20 is transferred to a second station where similar support mechanisms position the article 20 in a predetermined position in both the horizontal and vertical planes and with respect to both the top surface of the molten sealing composition in the trough 40 and the contour of the trough. The trough 40 has the same contour pattern as that of the sealing edge 21 of the article 20. At this time the operator actuates peddle 101, against spring 108 to lower edge 21 toward the composition in trough 40 and in turn through switch 106 energizes the motor 82, which through the following drive mechanisms causes the rocking member 45 to be actuated. The motor 82 drives the gears 70 and 72 which in turn drives the yoke 53, link 50 and yoke 49. Through the free sliding connection between driven yoke 49 and shaft 47 of the rocking member 45, it will be found that member 45 will rock progressively about fulcrum pins 61, 62, and 63 due primarily to the axial rotation of member 49 about the vertical center line of the axis of the support 65. Thus, a progressively rolling contact as between the sealing edge 21 of the article 20 and the molten composition in the trough 40 will be obtained and prevent the formation of air pockets or voids on the underside of the horizontal surface of the sealing edge.

The design of this mechanism is such that it produces a wobbling action by attaching a universal joint, i. e., parts 45, 46, 47, 49, 50, and 53 in tandem with an inclinable bearing or member 50 which is rotated by the gear 70. The vertex of the universal is held in line with the vertical axis of rotation of the drive by the frame support 65. Thus, the duplicating of the wobble of a ball joint is obtained, but no axial rotation of members 45, 46, and 47 can occur. The bearing 49 is mounted on a device which allows the axis of the bearing to be offset from the axis of the drive gear 70 and yet remain in line with the vertex of the universal joint. As the drive is rotated with the bearing 49 in offset position, the locus of the axis of the bearing generates the surface of a cone whose vertex coincides with that of the universal. The dipping holder members 25, 26, and 27 are fastened to the center piece 45 of the universal from which it derives its progressively rolling dipping action.

The number of rolling dips will control the thickness of the coating on edge 21 while the adjustment of screws 55 and 56 control the depth of dip and with the obtaining of the desired thickness of coating, the operator permits spring 108 to return the support 45 and holder 25 to its normal upper position while simultaneously discontinuing rotation of the gear 70 and the rocking motion. The coated article is removed from this station and a new article with preheated edge is transferred from the first station to the coating station and the above described procedure is repeated in succession and on successive articles.

Modifications may be resorted to within the spirit and scope of the appended claims.

I claim:

1. In a device for coating the sealing edges of a glass article with a sealing composition, the combination of a supporting table, a heating member thereon adapted to apply heat to the sealing edges of the article, a trough for containing a sealing composition in molten form, means to support said edge heated article in vertical spaced relation to said trough and molten composition, and means to rollingly rock the said heated sealing edge of said article into progressively rolling contact with said molten composition.

2. In a device for coating the sealing edges of glass articles with a sealing composition, the combination of a supporting table, a heating member thereon adapted to supply heat to the sealing edges of the glass article, said heating means being contoured to the pattern of the said sealing edge of said article, a trough member contoured to the pattern of the sealing edge of said article and adapted to contain a molten sealing composition therein, means to support an article with its heated sealing edge in vertical spaced aligned relation to said contoured trough and molten composition, and means to rollingly rock the sealing edge of said article into progressively rolling contact with said molten composition.

3. In an apparatus for applying sealing composition to the sealing edges of glass parts, the combination of a table, means thereon for heating the sealing edge of the glass part, a trough on said table adapted to contain a molten sealing composition, means to support the glass part with respect to said molten sealing composition and means to progressively and rollingly rock the sealing edge of said part into said sealing composition.

4. In a device for coating the edges of vitreous articles with a sealing composition, the combination of a supporting table, a heating member and a trough member positioned side by side on said table, said trough adapted to contain a sealing composition in molten form, means to heat the sealing edge of said article, an article support adapted to position said vitreous article in vertically spaced relation to said trough and composition, means to vertically reciprocate said support, and means to rollingly rock the sealing edge of said article into progressively rolling contact with said molten composition.

5. In a device for coating the edges of glass articles with a sealing composition, the combination of a supporting table, a heating member and a trough member disposed side by side on said table, means to supply heat through said heating member to the sealing edge of said glass articles, said trough member being contoured to the pattern of the sealing edge of said glass articles and having a molten sealing composition therein, means to support the sealing edge of the glass article in vertically spaced and aligned relation with said contoured pattern, means to move said article support to and from said contoured trough and means to rollingly rock the sealing edge of said last-mentioned article into progressively rolling contact with said molten composition.

6. In a device for coating the edges of articles with a sealing composition, the combination of a supporting table having spaced apart operating stations thereon, an edge heating member at one of said stations adapted to heat the sealing edges of an article, a trough member adapted to contain molten sealing composition positioned at a second station on said table, means at said second station adapted to support said heated article above and in vertically spaced relation to said trough and composition, means to move the said support and article downwardly toward said composition in said trough, and means to rollingly rock said article support to bring the sealing edge of said article into progressively rolling contact with said molten composition.

References Cited in the file of this patent

UNITED STATES PATENTS

| | | |
|---|---|---|
| 2,068,250 | Thomas | Jan. 19, 1937 |
| 2,109,258 | Slayter | Feb. 22, 1937 |
| 2,567,331 | Gaiser et al. | Sept. 11, 1951 |